Figure 1:
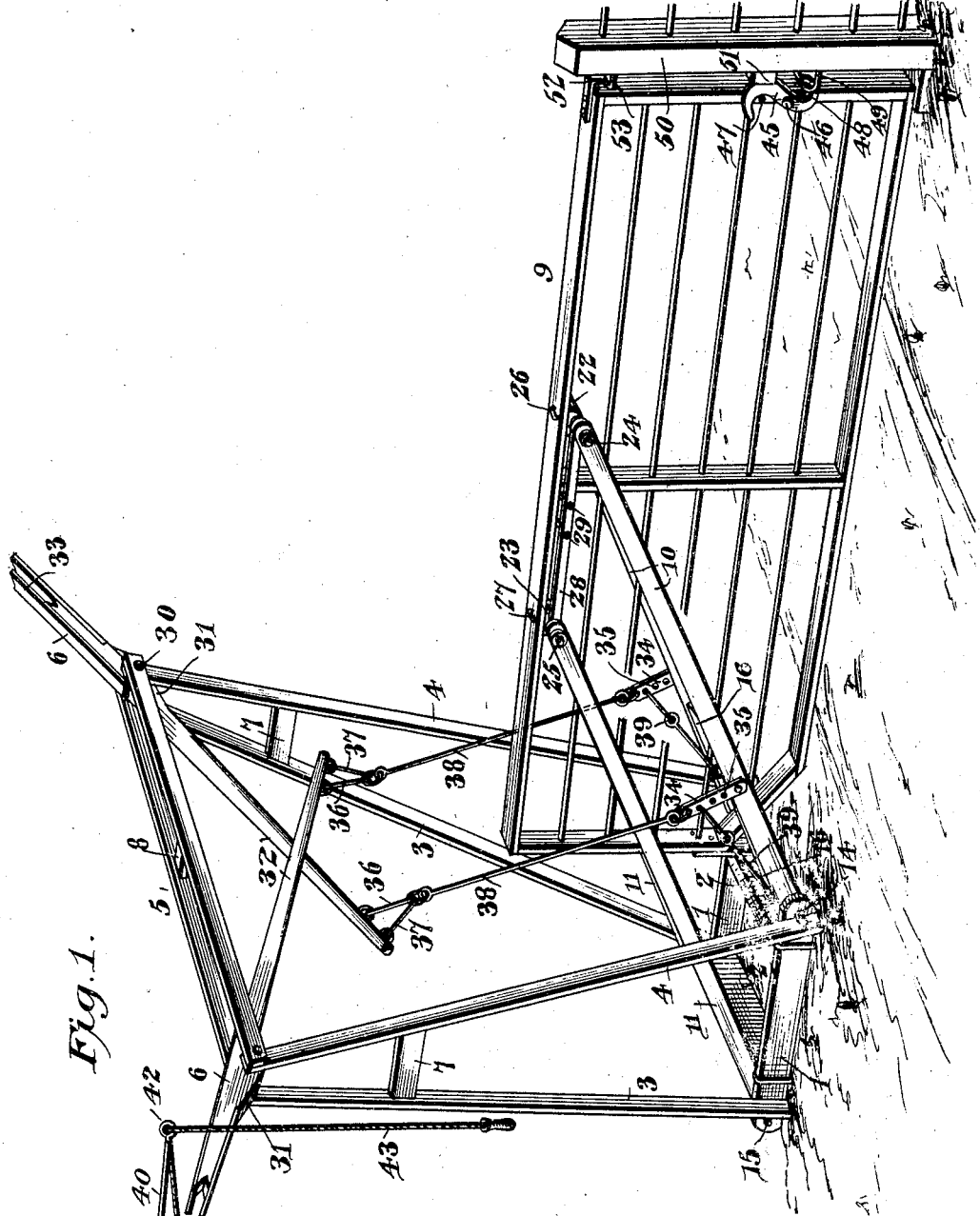

No. 794,403. PATENTED JULY 11, 1905.
H. H. GORTON.
GATE.
APPLICATION FILED MAY 12, 1904.

2 SHEETS—SHEET 1.

Witnesses
Jas. K. McCathran
N. H. Riley

Henry H. Gorton, Inventor
By C. G. Siggers
Attorney

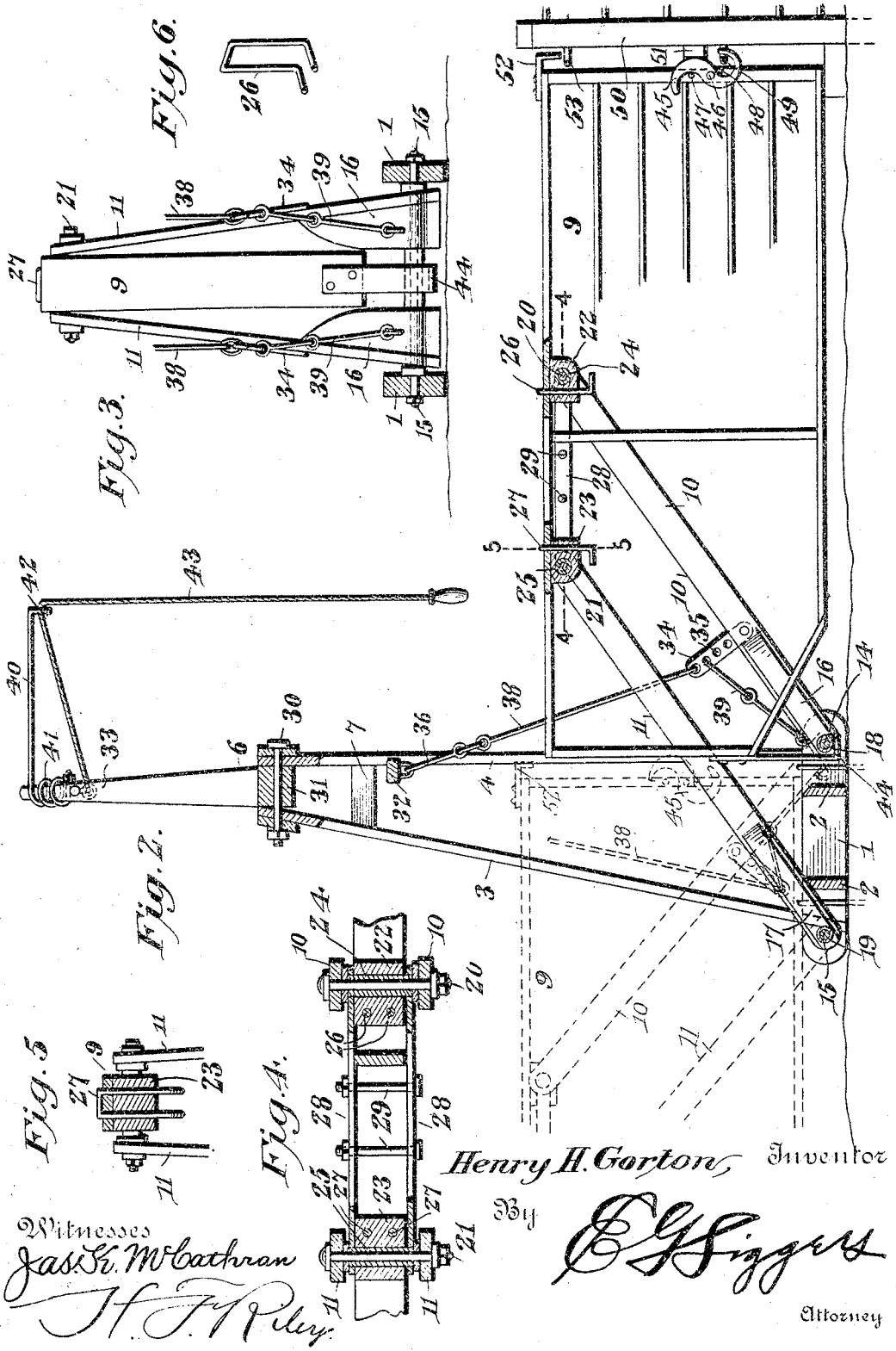

No. 794,403. Patented July 11, 1905.

UNITED STATES PATENT OFFICE.

HENRY HALE GORTON, OF WALLACE, MISSOURI.

GATE.

SPECIFICATION forming part of Letters Patent No. 794,403, dated July 11, 1905.

Application filed May 12, 1904. Serial No. 207,617.

*To all whom it may concern:*

Be it known that I, HENRY HALE GORTON, a citizen of the United States, residing at Wallace, in the county of Buchanan and State of Missouri, have invented a new and useful Gate, of which the following is a specification.

The invention relates to improvements in gates.

The object of the present invention is to improve the construction of gates and to provide a simple and comparatively inexpensive one of great strength and durability, adapted to be readily operated at a distance from either side of it.

A further object of the invention is to provide a gate of this character designed particularly for use in a level or prairie country and adapted to dispense with large posts.

Another object of the invention is to provide a reciprocating gate which will be partially counterbalanced by the operating mechanism and which will be securely locked in its closed position to prevent it from being opened by stock.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a gate constructed in accordance with this invention and shown closed. Fig. 2 is a side elevation, partly in section, the gate being shown closed in full lines and open in dotted lines. Fig. 3 is a rear elevation, partly in section. Fig. 4 is a horizontal sectional view on the line 4 4 of Fig. 2. Fig. 5 is a vertical sectional view on the line 5 5 of Fig. 2. Fig. 6 is a detail perspective view of one of the fastening devices for connecting the blocks with the top of the gate.

Like numerals of reference designate corresponding parts in all the figures of the drawings.

1 1 designate a pair of side bars or sills which are connected adjacent to their ends by transverse bars 2 and which form, with the same, the base of the supporting-frame. The base, which is rectangular, is designed to be firmly anchored on the surface of the ground by any suitable means, and it is adapted to obviate the necessity of employing large posts for securing the supporting-frame in position. The supporting-frame is provided at opposite sides with bars 3 and 4, arranged in pairs, as clearly illustrated in Fig. 1 of the drawings, and connected at their upper ends by top bars 5, disposed transversely of the supporting-frame. The bars 3 and 4 of each pair converge toward their upper ends, which are spaced apart for the reception of operating-levers 6, and the bars at the opposite sides of the frame are inclined upwardly and outwardly. The bars 3 and 4 are connected between their ends by short horizontal pieces 7, interposed between the said bars 3 and 4 and suitably secured to the same. The top bars 5, which are disposed horizontally, are parallel with each other and are spaced apart at the center by a block or piece 8. The base of the frame forms a firm support and does not require large posts; but should it be desired to employ heavy posts for securing the frame in position on the ground the lower ends of the upwardly-extending side bars can be brought together and secured to such posts.

The supporting-frame forms an arch and provides an opening through which the gate 9 reciprocates in opening and closing. The gate is carried longitudinally through an arc of a circle in its opening and closing movements by front and rear oscillatory bars 10 and 11, pivoted at their lower ends by rods 14 and 15 to the ends of the side bars 1 of the base of the supporting-frame. The ends of the side bars 1 are extended beyond the transverse connecting-bars 2 and are perforated for the reception of the pintle-rods 14 and 15. The lower portions of the oscillatory bars 10 and 11 are provided at their inner faces with tapering blocks or pieces 16 and 17, extending inwardly from the inner faces of the oscillatory bars and having their inner edges diverging upwardly. The upwardly-diverging inner edges of the tapering blocks or extensions 16 and 17 are adapted to snugly receive the adjacent portion of the gate when the same is in its open and closed positions, and they are also capable of freeing the gate as the latter moves upward in opening or closing to prevent the gate from binding against them and retarding such opening or closing movement. Suitable sleeves 18 and 19 are disposed on the pintle-rods and interposed between the extension blocks or pieces to space the same and to enable the lower ends of the oscillatory bars to be positively secured on the pintle-rods without causing the same to be forced inwardly too far. The outer ends of the pintle-rods 14 and 15 may be provided with nuts or any other suitable fastening devices, and washers are interposed between the outer edges of the oscillatory bars and the side bars of the base of the frame, as clearly illustrated in Fig. 3 of the drawings. The upper edges of the transverse bars 2 of the rectangular base of the supporting-frame are beveled, as shown, and receive the oscillatory bars when the gate is open and closed, as illustrated in Fig. 2 of the drawings. The upper ends of the oscillatory bars are connected by transverse pivots 20 and 21, which pierce the upper ends of the oscillatory bars and which also pass through front and rear blocks 22 and 23, interposed between the upper ends of the oscillatory bars and connected with the top of the gate, as hereinafter explained. The pivots 20 and 21 are provided with sleeves or bushings 24 and 25, which are interposed between the upper ends of the oscillatory bars. These pivots 20 and 21 preferably consist of bolts, and the sleeves or bushings permit the nuts to be tightened without causing the oscillatory bars to bind against the gate. The oscillatory bars are preferably constructed of wood, and suitable washers are interposed between the ends of the sleeves or bushings 22 and 23 and the inner faces of the said oscillatory bars. The front and rear blocks are loosely connected with the top of the gate by means of fastening devices 26 and 27, which permit the gate to turn easily and which greatly facilitate the opening and closing movements of the same. The fastening devices 26 and 27 preferably consist of staples, as clearly shown in Fig. 6 of the drawings, and have their connecting portions arranged at the upper face of the top bar of the gate. The sides or legs of the staples pass through perforations of the blocks 22 and 23 and have their lower ends bent at an angle for engaging the lower faces of the blocks. The sides or legs of the staples are of a length in excess of the thickness of the blocks and the top bar of the gate to permit a limited movement of the gate independent of the oscillatory bars.

The oscillatory bars are connected at the top of the gate by means of parallel side bars 28, designed to be constructed of any suitable material and adapted to prevent the oscillatory bars from warping or twisting. The side bars or pieces 28 are preferably connected by transverse rods 29, located between the front and rear oscillatory bars.

The operating-levers, which are fulcrumed between their ends by pivots 30, are provided with bearing blocks or pieces 31 and are composed of an inner solid bar or member 32 and a pair of thin outer bars or strips 33, secured at their inner ends to the bar or member 32 and spaced apart thereat by the same. The pivots 30 consist of fastening devices which pass through the bearing blocks or pieces 31 of the levers and which pierce the adjacent overlapped ends of the bars 3, 4, and 5. The outer ends of the bars or strips are secured together, as shown. The operating-levers, which have their inner ends crossed, as clearly illustrated in Fig. 1 of the drawings, are connected with the front oscillatory bars and are adapted in opening and closing the gate to partially counterbalance the same, whereby the gate may be readily operated. The front oscillatory bars are provided with plates or links 34, pivoted at their lower ends and provided at intervals with perforations 35 and connected at their upper ends with inner and outer links 36 and 37 of the operating-levers by cables or rods 38 or other suitable connections. The perforations permit the connections between the front oscillatory bars and the operating-levers to be adjusted or varied in length to suit the arrangement of the inner ends of the operating-levers and to enable the center of gravity to be arranged directly beneath the operating-levers when the oscillatory bars are in a perpendicular position, whereby the strokes or movements of the levers in opening and closing the gate will be the same. This adjustment also accommodates the connection to the position of the levers, which may be set at an angle to cause their outer ends to project over the roadway the desired distance. The plates or links of the oscillatory bars are connected with flexible stays or braces 39, which extend upward from the lower portion of the oscillatory bars to the outer portions of the plates or links 34. These braces or stays may consist of a plurality of links or may be constructed in any other desired manner. The inner links 36 afford greater power in starting the movement of the gate to open and close the same, and the outer links are brought into action when the gate is near the center of its movement and are adapted to prevent the gate from stopping on the center.

The operating-levers are provided at their outer ends with angularly-disposed arms 40, consisting of rods provided at their inner ends with spring-coils 41 and having eyes 42 at their outer ends. The spring-coils are disposed on the outer ends of the operating-levers and are secured to the same, whereby the arms are yieldably connected with the levers. The eyes 42 receive operating-ropes 43 or other suitable flexible connections, which are attached to the levers and which depend from the outer ends of the arms 40, being provided at their lower ends with suitable grips or handles, as shown. The arms support the operating-ropes in a convenient position over the roadway, whereby they may be readily grasped by a person on horseback or in a vehicle. When the outer arm of either lever is swung downward, the oscillatory bars will be actuated to reciprocate the gate, which is carried to the center of its movement by a direct pull of the levers and which is carried over and beyond the center by the momentum it has acquired. The weight of the gate causes a positive completion of the movement after the gate has passed the center. The front oscillatory bars actuate the gate, and the rear oscillatory bars maintain the gate in a horizontal position.

The gate is provided at its rear end with a bottom catch 44, which is approximately L-shaped or hook-shaped, and it depends from the bottom of the gate in position for engaging beneath the pintle-rod 18 when the gate is closed. The gate in opening is moved rearward sufficiently to disengage the rear catch from the pivot or pintle-rod. This catch is adapted to prevent the rear end of the gate from being lifted by stock.

The gate is provided at its front end with a substantially S-shaped latch 45, pivoted below the center by a pin 46 or other suitable fastening device and having its movement limited by upper and lower stops 47 and 48. The lower end of the latch curves forwardly and outwardly and engages a keeper 49 of a latch-post 50. The keeper preferably consists of a horizontal staple or loop arranged as shown. The upper portion of the latch presents a convexly-curved front edge and is engaged by a projecting block 51 when the gate is closed, whereby the lower engaging portion of the latch will be thrown forward or outward beneath the said keeper 49. The opening movement of the gate carries the upper portion of the latch away from the fixed abutment and permits the lower portion to swing out of engagement with the loop. The latch is operated automatically by the opening and closing movements of the gate. The block 51, which forms a fixed abutment, is secured to the latch-post above the keeper. The latch will prevent the front of the gate from being lifted by stock.

The gate is also provided at its front with a top catch 52, which is substantially L-shaped or hook-shaped, which has a depending arm arranged to engage an upper keeper 53. The front upper catch is normally located above the upper keeper when the gate is closed; but should the front end of the gate be depressed through any cause the top catch 52 will engage the upper keeper 53 and hold the gate against rearward movement. In practice there will be sufficient space between the rear catch 44 and the rear pintle to allow for the slight lift of the gate in opening, and should the rear end of the gate be raised the catch 52 will be caused to engage the keeper 53. This will effectually prevent the gate from being unlocked by raising the rear end.

Having thus fully described my invention, what I claim as new, and desire to secure by Letters Patent, is—

1. The combination with a gate, of oscillatory bars pivotally connected with the gate and provided at their lower portions with tapering extensions arranged to engage the gate when the same is open or closed, and means for actuating the gate, substantially as described.

2. The combination of a gate, oscillatory bars connected with the gate, operating-levers provided with inner and outer links connected thereto at different points and arranged at an angle, and connections extending from the links to the oscillatory bars, substantially as described.

3. The combination of a gate, oscillatory bars connected with the same, plates connected with the oscillatory bars and provided with perforations, stays connected with the bars and with the plates, operating-levers, and connections between the plates and the operating-levers, said connections being adjustable through the said perforations, substantially as described.

4. The combination of a gate, oscillatory bars, plates pivotally connected with the bars, flexible stays extending from the plates to the bars, operating-levers provided with inner and outer links arranged at an angle, and connections between the plates and the links, substantially as described.

5. The combination of a gate, oscillatory bars, means for pivotally connecting the oscillatory bars with the gate and for permitting the gate to have a limited upward and downward movement independent of the oscillatory bars, and means for actuating the gate, substantially as described.

6. The combination of a gate, oscillatory bars, blocks pivotally connected with and interposed between the bars, and fastening means connected with the gate and slidable on the blocks, substantially as described.

7. The combination of a gate, oscillatory bars, blocks pivotally connected with the oscillatory bars, and fastening devices connected with the gate and extending through the blocks and provided with means for engaging the same, the said fastening devices being of sufficient length to permit the gate to have a limited upward and downward movement independent of the oscillatory bars, substantially as described.

8. The combination of a gate, oscillatory bars, blocks pivotally connected with the oscillatory bars and secured to the gate, the latter having a limited upward and downward movement independent of the oscillatory bars, and side bars connecting the upper ends of the oscillatory bars, substantially as described.

9. The combination of a gate, oscillatory bars having upper and lower pivots and connected with the gate, a bottom catch mounted on the gate and arranged to engage the lower pivot when the gate is closed, and a latch carried by the front of the gate, substantially as described.

10. The combination of a gate, oscillatory bars pivoted at the lower ends and connected with the gate, and a fixed catch carried by the gate and arranged to extend beneath the lower pivot of the oscillatory bars for holding the gate against upward movement, substantially as described.

11. The combination of a gate, oscillatory bars connected with the gate, and a fixed L-shaped catch carried by the rear end of the gate for holding the same against upward movement when the gate is closed, substantially as described.

12. The combination of a fixed abutment, a keeper arranged beneath the same, a gate, means for moving the gate through an arc of a circle for opening and closing it, and a substantially S-shaped latch pivoted between its ends at the front of the gate, the upper portion of the latch being carried by the closing movement of the gate into contact with the fixed abutment to swing the lower portion of the latch into engagement with the keeper, and the opening movement of the gate being adapted to carry the upper portion of the latch away from the fixed abutment to permit the lower portion of the latch to swing out of engagement with the keeper, whereby the latch is automatically operated by the movement of the gate, substantially as described.

13. The combination of a fixed abutment, a keeper arranged beneath the same and consisting of a horizontal loop, a gate, means for moving the gate through an arc of a circle for opening and closing it, a substantially S-shaped latch pivoted between its ends at the front of the gate, the upper portion of the latch being carried by the closing movement of the gate into contact with the fixed abutment to swing the lower portion of the latch into engagement with the keeper, and the opening movement of the gate being adapted to carry the upper portion of the latch away from the fixed abutment to permit the lower portion of the latch to swing out of engagement with the keeper, whereby the latch is automatically operated by the movement of the gate, and stops mounted on the gate and arranged to be engaged by the upper and lower portions of the latch for limiting the movement thereof, substantially as described.

14. The combination of a gate, oscillatory bars, a catch arranged at the back of the gate, a latch located at the front of the gate, a keeper, and a catch also located at the front of the gate and arranged normally out of engagement with the keeper and adapted to be carried into engagement with the same when the front end of the gate is depressed, substantially as described.

15. The combination of a gate, oscillatory bars connected with the gate, a latch arranged at the front of the gate, a keeper, and a catch also located at the front of the gate and arranged normally out of engagement with the keeper and adapted to be carried into engagement with the same when the front end of the gate is depressed, substantially as described.

16. The combination of a gate, oscillatory bars connected with the gate, a catch mounted on the back of the gate and arranged to engage the pivot of the oscillatory bars, keepers located adjacent to the front of the gate, a latch having a hook-shaped portion for engaging one of the keepers, and a catch also mounted on the front of the gate and arranged to engage the other keeper and being normally out of engagement with the same when the gate is closed, substantially as described.

17. The combination of a gate, an operating-lever connected with the gate, an arm extending from the lever and yieldably connected with the same, and means depending from the arm for operating the lever, substantially as described.

18. The combination with a gate, and an operating-lever connected with the same, of an arm extending outward from the operating-lever and provided at its inner end with a spring-coil secured to the lever, and a flexible connection attached to the lever and extending therefrom to the outer portion of the arm and depending from the latter, substantially as described.

In testimony that I claim the foregoing as my own I have hereto affixed my signature in the presence of two witnesses.

HENRY HALE GORTON.

Witnesses:
 FRANK SCHROEDER,
 ROBT. H. BRYAN.